United States Patent Office 3,480,584
Patented Nov. 25, 1969

3,480,584
ORGANOSILICON MODIFIED MATERIALS
David Frederick Archer, Cowbridge, Glamorgan, and Glyn Islwyn Harris, Dinas Powis, Glamorgan, Wales, assignors to Midland Silicones Limited, Reading, England, a British company
No Drawing. Filed May 24, 1967, Ser. No. 640,819
Claims priority, application Great Britain, June 2, 1966, 24,683/66; Oct. 12, 1966, 45,655/66
Int. Cl. C08g 31/16
U.S. Cl. 260—46.5         18 Claims

ABSTRACT OF THE DISCLOSURE

A composition which cures when exposed to atmospheric moisture consisting of an anhydrous mixture of a silanol condensation catalyst with an organo-silicon modified organic polymer comprising a carbon chain backbone resulting from the copolymerization of at least one vinylic monomer selected from the group consisting of styrene, alkyl acrylates, alkyl methacrylates, acrylonitrile, isoprene, chloroprene, butadiene, vinyl pyridine, vinyl alkyl ethers, vinylidene chloride and isobutylene, with an organosilicon monomer of the general formula

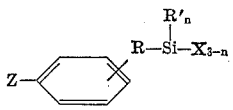

wherein Z is a monovalent olefinically-unsaturated hydrocarbon radical, R is a divalent aliphatic hydrocarbon radical, R' is selected from the group consisting of hydrogen, monovalent hydrocarbon radicals and monovalent halogenated hydrocarbon radicals, X is an alkoxy radical and $n$ is an integer of from zero to 2, 0.1 to 20 units derived from said organosilicon monomer being present per 100 units derived from said vinylic monomer. The composition is cured to form a solid polymeric material by exposing said mixture to moisture.

---

This invention relates to novel organosilicon compositions.

It is known to polymerise organic compounds containing aliphatic olefinic unsaturation, for example styrene, ethylene and vinyl chloride to provide thermoplastic polymeric materials which find use for example in coating compositions, in the preparation of sheets or the manufacture of moulded or extruded articles.

We have now found that by including certain organosilicon compounds in the reaction mixture during the polymerisation or copolymerisation of such unsaturated organic compounds there are obtained silicon-modified organic materials having desirable properties. In particular we have found that there can be prepared silicon-containing organic polymers which are convertible from a flowable or plastic state to a cured or hardened state at relatively low temperatures, often the organosilicon-modified organic polymers being convertible to the solid state simply by exposure of the material to the action of moisture.

There is provided a process for the preparation of organosilicon-modified organic polymers, which comprises co-polymerising under substantially anhydrous conditions a polymerisable, organic vinylic compound with 0.1–20 moles per 100 moles of organic vinylic compound of an organosilicon compound of the general formula

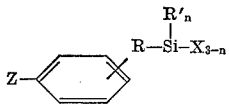

wherein Z is a monovalent olefinically-unsaturated hydrocarbon radical, R is a divalent aliphatic hydrocarbon radical, R' is a hydrogen atom, a monovalent hydrocarbon radical or monovalent halogenated hydrocarbon radical, X is an alkoxy radical and $n$ has a value of 0, 1 or 2.

The invention also includes organosilicon-modified organic polymers comprising a carbon chain backbone resulting from the polymerisation of at least one vinylic monomer, said chain having linked thereto at least one unit of the general formula

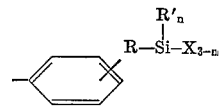

(where R, R', X and $n$ are as defined in claim 1) either directly or indirectly through an intermediate hydrocarbon radical. Such polymers are obtained by the aforesaid process and the invention also includes the curing of such polymers by the action of moisture.

In the general formula of the organosilicon compounds employed in the process of this invention Z may be any monovalent hydrocarbon radical containing olefinic unsaturation. Preferably Z contains from 2 to 18 carbon atoms and comprises, for example, the vinyl radical, the allyl radical, the methallyl radical or the hexenyl radical. Preferably Z is the vinyl radical. In the process the carbon atoms of the olefinic linkage become incorporated as part of the carbon backbone chain of the polymer which results from polymerisation of the organic vinylic compound. Thus the resulting copolymer has linked to this backbone chain at least one unit of the general formula

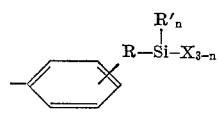

(where R, R', X and $n$ are as hereinbefore defined) and such unit will be linked directly to the backbone chain when Z in the organosilicon reactant is a vinyl group (as is preferred) or indirectly through an intermediate hydrocarbon radical when Z is some other monovalent hydrocarbon radical containing olefinic unsaturation.

The radical R may be any divalent aliphatic hydrocarbon radical including for example the methylene, ethylene, propylene, octadecylene and polymethylene radicals. Both the silicon atom and the benzene ring may be joined to the same carbon atom. The radical R is preferably attached at either the meta or para positions relative to Z in the phenylene radical.

As the hydrolysable substituent X, examples of alkoxy radicals are: methoxy, ethoxy, and butoxy.

When present, the R' substituent in the general formula of the said organosilicon compound may be a hydrogen atom or a monovalent hydrocarbon radical, for example an alkyl radical such as a methyl, ethyl, propyl or octadecyl radical, an alkenyl radical such as the vinyl or allyl radical or an aryl radical such as the phenyl radical or the naphthyl radical. The substituent R' may also be a monovalent halogenated hydrocarbon radical such as the chlorophenyl, chloromethyl, bromoethyl or trifluoropropyl radicals.

The said organosilicon compound may be prepared by any suitable method. One convenient route to the compound comprises reacting a silicon compound of the general formula

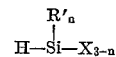

with an organic compound having aliphatic unsaturation in the molecule and of the general formula

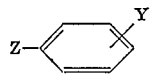

wherein Y is a radical containing aliphatic unsaturation and Z has the value hereinbefore attributed to it. This reaction is best carried out in presence of a platinum or platinum-containing catalyst employing conditions which are adjusted to promote, as far as possible, reaction between the compound $HSiR'_nSiX_{3-n}$ and the Y groups of the organic compound, the reaction with the Z groups being minimised.

In view of the ready availability of the organic reactant the preferred organosilicon compounds are those obtained by the addition of the compound $HSiR'_nX_{3-n}$ to the meta or para forms of divinylbenzene or mixtures of the two. When commercial grade divinylbenzene is employed this may consist of mixtures of the ortho, meta and para isomers of the compound.

The polymerisable, organic, vinylic compound employed in the process of this invention is purely organic in nature, that is it does not contain silicon, and can be any organic compound which is capable of being polymerised by way of ethylenically unsaturated groups contained within its molecules and copolymerisable with the said organosilicon compound. Such compounds are well known in the art and include as preferred examples for present purposes: styrene, alkyl acrylates, alkyl methacrylates, acrylonitrile, isoprene, chloroprene, butadiene, vinylpyridine, vinylalkyl ethers, vinylidene chloride and isobutylene. If desired, mixtures of such organic vinylic compounds may be employed and in some cases the use of mixtures to obtain certain desired properties in the end product may be preferred.

When preparing the polymers according to the process of this invention the polymerisable organic vinylic compound and the said organosilicon compound are copolymerised by subjecting a mixture of the two to vinyl polymerising conditions. The vinyl polymerising conditions are well known in the art of polymerising the organic vinylic compounds. It is however desirable in the present invention to obtain a reaction product in which there are present at least some silicon-bonded hydrolysable radicals. In order to preserve these radicals therefore the copolymerisation of the organosilicon compound and the organic vinyl compound is carried out under substantially anhydrous conditions. Any solvents, diluents or other components of the reaction mixture should therefore be employed in the substantial absence of water. While mass polymerisation is possible, solution polymerisation is much preferred and as solvents there may be used compounds in which the reactants and catalyst are soluble and which are not unduly affected by free radicals. Aromatic hydrocarbons, for example benzene, toluene, xylene, p-cymene and di-isopropylbenzene are preferred but less volatile solvents, such as dibutyl phthalate can be used whereafter they remain associated with the resulting polymer as plasticiser therefor.

Apart from the requirement that the process of this invention shall be performed in the absence of water the conventional vinyl polymerising conditions are applicable. Thus any of the conventional catalysts for polymerising organic vinyl compounds may be employed such as aliphatic azo compounds, or organic peroxides and other per compounds, for example benzoyl peroxide, tertiary butyl perbenzoate or peracetic acid. The use of a catalyst is not, however, essential in all cases. There may also be incorporated with the essential reactants materials, for example mercaptans, which are reactive with the terminal groups in the organic compound and which may therefore function as chain terminating units to limit the molecular size of the reaction product and/or the extent of cross-linking therein. Limitation of the molecular size of the products obtained by the copolymerisation is in many cases advantageous, especially when the materials are intended for application in a flowable form in the absence of solvents or diluents. In such cases we prefer to adjust the copolymerisation conditions or components to obtain copolymers of relatively low molecular weight.

A wide range of temperatures may be employed for the copolymerisation reaction according to the invention, varying from below room temperature to temperatures of 150° C. or above. Preferably the reaction is performed at or about the reflux temperature of the reaction mixture, that is generally from about 70° C. to about 150° C.

The organosilicon-modified polymers of the invention may be liquid, resinous or rubbery in nature, the nature of the product depending mainly upon the nature of the starting materials and their relative proportions. If desired unsaturated organosilicon compounds not containing silicon-bonded hydrolysable radicals, for example compounds such as

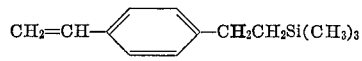

may also be included in the reaction mixture and copolymerised with the essential reactants to provide the copolymer with certain specific properties, for example release or water-repellent properties.

The relative molar proportions of the organosilicon compound and the organic vinylic compound may vary within the range of 0.1–20 moles percent of the organosilicon compound based on the total quantity of polymerisable organic vinylic compound or compounds employed. Preferably the organosilicon compound is employed in an amount of from 0.2–10 moles percent on this basis, the exact amount often being adjusted to obtain the desired rate of cure of the resulting polymer when this is exposed to moisture but often being from 0.5–1.5 mole percent. Thus many of the organosilicon-modified polymers of the invention which contain two or more silicon-bonded hydrolysable radicals will harden on exposure to moisture and form resinous or rubbery materials. The presence of a silanol condensation catalyst is necessary, but this need only be present in very small amount and can often be provided in situ. Thus, if in the organosilicon compound X represents a chlorine atom or acetoxy radical, hydrolysis of the modified polymer will liberate hydrogen chloride or acetic acid, both of which are effective silanol condensation catalysts. Nevertheless in many cases, for example in applications involving the curing of the modified polymer in contact with a metal, the presence in the polymer of chlorine atoms or acetoxy radicals as the sole silicon-bonded hydrolysable radicals would in most cases be undesirable where corrosion of the metal is an important factor. However, it has been found that, if the hydrolysable radicals are alkoxy, preferably ethoxy, with up to 2 percent of such radicals being chlorine, there is usually generated in situ sufficient hydrogen chloride to act as the desired silanol condensation catalyst when the organosilicon-modified polymer is exposed to moisture. If desired the rate of hardening may be accelerated by incorporating other silanol condensation catalysts, for example, stannous octoate, dibutyltin dilaurate or tetra-isopropyl-titanate into the polymer composition.

By suitable choice of the starting materials organosilicon-modified polymers may be obtained according to this invention which after curing range from hard resins to flexible elastomers or soft gel-like materials. The nature of the organic reactant or mixture of reactants will also determine to a large extent the final properties of the organosilicon-modified polymer. Thus, for example, by including acrylonitrile, ethyl acrylate or chloroprene in the reaction mixture materials may be obtained which, when cured, are resistant to deterioration under the action of oils and solvents. Similarly, by choosing organic reactants containing strong polar groups copolymers can be prepared having improved adhesion to a variety of substrates. The copolymers of this invention are therefore suitable for use in a wide variety of applications either per se or in combination with other materials such as solvents, pigments, fillers and plasticisers. Applications of the copolymers include their use in sealing compositions, as coating materials and in the preparation of insulating materials for electrical apparatus. For example, solvent solutions of the copolymers of this invention may be employed to coat a wide variety of substrates including paper, textiles and glass fabrics, for example by using the copolymers as release agents or as sizes for glass fibres and fabrics. The copolymers also find application in the building industry as sealants for window glazing, curtain walling, air ducts and a variety of other building or masonry structures such as dams, tunnels, roal surfaces and bridges. In addition the copolymers, or compositions containing them, may be used for encapsulating fragile electronic components, as adhesives for bonding to substrates such as wood, stone and metal and in paints and other surface finishes.

The copolymers of this invention are in general susceptible to the action of moisture and they, and compositions containing them, are best stored under anhydrous conditions prior to use. Conveniently the anhydrous compositions may be stored in sealed metal containers until required for use at which time they may be cured on removal from the container and exposure to ambient humidity.

The following examples illustrate the invention. In Examples 1-4 the (vinylphenyl)ethyl triethoxysilane employed contained a small amount of residual silicon-bonded chlorine atoms approximating to about 1 such chlorine atom per 150 silicon-bonded ethoxy groups.

Example 1

Styrene (14.8 g., 0.142 mole) and (vinylphenyl)ethyltriethoxysilane

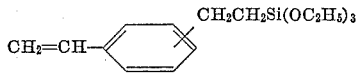

(4.17 g., 0.0142 mole), which had been prepared from a mixture of divinyl benzenes containing predominantly the meta and para isomers, were dissolved in benzene (20 g.) and benzoyl peroxide (0.06 g.) added to the solution so obtained. The solution was then refluxed for 1.5 hours and the reaction product separated after this time by pouring the reaction mixture into methanol to remove unreacted styrene. After separation from the methanol layer the product was re-dissolved in benzene and this solution again agitated with methanol. The product layer was then separated and dissolved in benzene to give an approximately 25 percent by weight solution.

When the solution was allowed to stand overnight in a sealed vessel in which the ambient atmosphere had a temperature of 22° C. and a relative humidity of 40% it set to a rubber-like gel.

When the experiment was repeated with the silane reactant omitted a benzene solution of polystyrene was obtained which remained in liquid form and which showed no tendency to harden on being allowed to stand overnight.

Example 2

Ethyl acrylate (20.4 g., 0.204 mole), (vinylphenyl) ethyltriethoxysilane (6 g., 0.0204 mole) and benzoyl peroxide (0.08 g.) were dissolved in benzene (25 g.) and the solution, after refluxing for 1.25 hours, was added to n-pentane to separate the reaction product as an immiscible layer. The separated product was dissolved in benzene to give a 30% by weight solution.

When this solution was allowed to stand overnight in a sealed vessel in which the ambient atmosphere had an initial relative humidity of 40% and a temperature of 22° C. it was converted to a rubber-like gel.

When the experiment was repeated with the silane reactant omitted a benzene solution of polyethylacrylate was obtained which exhibited no tendency to gel on standing.

Example 3

Ethyl acrylate (75 g., 0.75 mole), (vinylphenyl)ethyltriethoxysilane (2.94 g., 0.01 mole), benzoyl peroxide (0.3 g.) and butanethiol (0.34 g.) were dissolved in benzene (30 g.) and the solution heated in a constant temperature oil bath at 90° C. for 2 hours. During this period the reactants were stirred continuously and maintained under an atmosphere of nitrogen. The butanethiol was included in the reaction mixture in order to limit the degree of polymerisation of the copolymer by reaction with terminal groups.

On separation in n-pentane, and removal of the solvent by stripping, the reaction product was found to be a liquid of high viscosity. This liquid set to a firm rubber-like material in less than 24 hours on exposure to the atmosphere but was stable on storage under anhydrous conditions.

Example 4

Acrylonitrile (2.65 g., 0.05 mole), ethyl acrylate (45 g., 0.45 mole), (vinylphenyl)ethyltriethoxysilane (0.735 g., 0.0025 mole), butanethiol (0.45 g., 0.05 mole) and benzoyl peroxide (0.3 g.) were mixed in a reaction vessel and the mixture heated at 90° C. for 10 minutes under at atmosphere of nitrogen.

When cool the contents of the reaction vessel were added slowly with stirring to n-pentane to dissolve unreacted materials. Two layers formed, the lower one comprising the required reaction product. After separating from n-pentane a second time the reaction product was recovered and stripped of solvent and other volatiles at 90° C. under 0.5 mm. Hg pressure to give a clear viscous liquid. When this liquid was exposed to the atmosphere at 22° C., relative humidity approximately 50%, it cured to a soft rubber within 24 hours, and to a firm rubber within 4 days.

Example 5

Ethyl acrylate (50 g. 0.5 mole), (vinylphenyl)ethyltriethoxysilane (2 g. 0.0068 mole) and di-t.-butyl peroxide (0.73 g.) were added during 15 minutes to di-iso-propyl benzene at 190–200° C., the temperature falling to 120° C. during the addition. The mixture was then heated to 190° C. for 30 minutes and stripped of volatiles at 140° C. at a pressure of 0.05 to 0.1 mm. Hg for 3.5 hours to give a viscous fluid. Samples of this fluid, catalysed with tetra-iso-propyl titanate (4%) and with dibutyltin diacetate (2%) each cured to soft rubbers in 24 hours.

A further sample (21 g.) was mixed with dried zinc oxide (12 g.) and after stripping at a pressure of 0.1 mm. Hg for 0.5 hour was catalysed with dibutyltin diacetate (4%). A portion of this material exposed to the atmosphere cured to a rubbery product in 24 hours. A second portion placed in a sealed tube remained fluid for 6 months, and on being exposed to the atmosphere after this period cured to a rubbery material in 2-3 days.

Example 6

Ethyl acrylate (50 g., 0.5 mole), benzoyl peroxide (0.6 g.) (vinylphenylethyltriethoxysilane (0.44 g., 0.0015 mole) dimethylaniline (0.05 g.) and toluene (100 ml.) were stirred at room temperature under an inert atmosphere for 16 hours. After stripping to remove 50 ml. of toluene, the dibutyltin diacetate (2%) was added to the viscous fluid and this then cured to a soft rubber in less than 24 hours.

When more toluene was removed from another sample and the very viscous fluid obtained plasticised with dibutyl phthalate (20%), a stronger rubber was obtained 24 hours after the addition of dibutyltin diacetate (2.5%).

Example 7 n-Octyl methacrylate (0.25 mole), (vinylphenyl)ethyltriethoxy silane (0.44 g., 0.0015 mole), dibutylphthalate (20 g.), toluene (28 ml.) and di-t.-butylperoxide (0.365 g.) were heated at 115° C. for 1.5 hours in an inert atmosphere. Stripping at 115° C. at 0.5 to 1.0 mm. Hg for 2 hours gave a yellow fluid.

A sample of this fluid was catalysed with dibutyltin dilaurate and a soft rubber obtained in 24 hours. A further sample (10 g.) mixed with zinc oxide (15 g.) cured to a stronger rubber in 24 hours when catalysed with dibutyltin diacetate (2%).

Example 8

Ethyl acrylate (0.4 mole), n-butyl methacrylate (0.1 mole), (vinylphenyl)ethyl dimethoxymethyl silane (1.2 g., 0.005 mole) di-t.-butyl peroxide (0.73 g.) dibutyl phthalate (40 ml.) and toluene (50 ml.) were heated at 115° C. in an inert atmosphere for 2.25 hours. Stripping at 0.1 to 0.2 mm. Hg at 115° C. for 2 hours gave a viscous fluid. A sample of this fluid, catalysed with dibutyltin diacetate (3%) cured in 2-3 days to a very soft rubber. A second sample (15 g.) mixed with zinc oxide (7.5 g.) cured to a stronger rubber when catalysed with dibutyltin diacetate.

Example 9

The process of Example 8 was repeated but with the n-butyl methacrylate being replaced with methyl methacrylate and using 0.7 g. of the dimethoxy silyl monomer. After stripping a viscous fluid was obtained which, on mixing with zinc oxide filler and catalysing with dibutyltin diacetate cured in 3 days to a weak rubber.

Example 10

Ethyl acrylate (0.5 mole), (vinylphenyl)ethyl triethoxysilane (0.00092 mole), benzoyl peroxide (0.0009 mole) and toluene (50 ml.) were heated at 115° C. under an inert atmosphere for 17 hours. Dibutyl phthalate (10 g.) was added and a viscous liquid obtained after stripping of volatile material. On addition of dibutyltin diacetate the polymer cured to a rubbery solid in 24 hours.

We claim:

1. A composition curable on exposure to atmospheric moisture consisting essentially of an anhydrous mixture of:
 (A) an organosilicon modified organic polymer consisting essentially of a carbon chain backbone resulting from the copolymerisation of at least one vinylic monomer selected from the group consisting of styrene, alkyl acrylates, alkyl methacrylates, acrylonitrile, isoprene, chloroprene, butadiene, vinyl pyridiene, vinyl alkyl ethers, vinylidene chloride and isobutylene, with an organosilicon monomer of the general formula

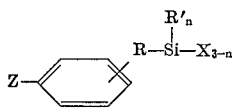

wherein Z is a monovalent olefinically-unsaturated hydrocarbon radical, R is a divalent aliphatic hydrocarbon radical, R' is selected from the group consisting of hydrogen, monovalent hydrocarbon radicals and monovalent halogenated hydrocarbon radicals, X is an alkoxy radical and $n$ is an integer of from zero to 2, 0.1 to 20 units derived from said organosilicon monomer being present per 100 units derived from said vinylic monomer; and
 (B) a silanol condensation catalyst.

2. The cured composition of claim 1.

3. A composition according to claim 1 wherein the said organosilicon copolymer contains 0.5 to 1.5 of said units per 100 units of vinylic monomer.

4. The cured composition of claim 3.

5. A composition according to claim 1 wherein R is —$CH_2CH_2$— and $n$ is zero.

6. The cured composition of claim 5.

7. A composition according to claim 1 wherein said vinylic monomer is selected from the group consisting of alkyl acrylates and alkyl methacrylates.

8. The cured composition of claim 7.

9. A composition according to claim 1 wherein the silanol condensation catalyst is provided by the presence in the said organosilicon modified polymer, of units of the said general formula wherein chlorine replaces up to 2% of said alkoxy radicals designated as X in said general formula.

10. The cured composition of claim 9.

11. A composition according to claim 1 wherein said condensation catalyst is at least one compound selected from the group consisting of stannous octoate, dibutyltin dilaurate, and tetra-isopropyl-titanate.

12. The cured composition of claim 11.

13. A composition curable on exposure to atmospheric moisture consisting essentially of an anhydrous mixture of:
 (A) an organosilicon modified organic polymer comprising a carbon chain backbone resulting from the copolymerization of at least one vinylic monomer selected from the group consisting of styrene, alkyl acrylates, alkyl methacrylates, acrylonitrile, isoprene, chloroprene, butadiene, vinyl pyridine, vinyl alkyl ethers, vinylidene chloride and isobutylene, with an organosilicon monomer of the general formula

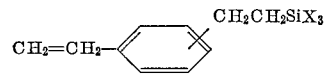

wherein X is an alkoxy radical, 0.5 to 1.5 units derived from said organosilicon vinomer being present per 100 units derived from said vinylic monomer; and
 (B) a silanol condensation catalyst.

14. The cured composition of claim 13.

15. A composition according to claim 13 wherein the said organic vinylic compound is selected from the group consisting of alkyl acrylates and alkyl methacrylates and X is methoxy or ethoxy.

16. The cured composition of claim 15.

17. A composition according to claim 13 wherein the silanol condensation catalyst is provided by the presence in the said organosilicon modified polymer of units of the said general formula wherein chlorine replaces up to 2% of said alkoxy units designated as X in said general formula.

18. The cured composition of claim 17.

References Cited

UNITED STATES PATENTS

| | | | |
|---|---|---|---|
| 2,634,252 | 4/1953 | Warrick | 260—46.5 |
| 2,746,942 | 5/1956 | Sample et al. | 260—23 |
| 3,383,355 | 5/1968 | Cooper | 260—46.5 |
| 2,570,551 | 10/1951 | Hatcher et al. | 260—46.5 |
| 3,223,686 | 12/1965 | Natta et al. | 260—80 |

JOSEPH L. SCHOFER, Primary Examiner

J. C. HAIGHT, Assistant Examiner

U.S. Cl. X.R.

260—80.3, 82.1, 85.5, 85.7, 86.1, 87.5, 87.7, 88.1